United States Patent [19]

Kapich

[11] 4,413,348
[45] Nov. 1, 1983

[54] SYSTEM FOR PRODUCING PROCESS HEAT

[75] Inventor: Davorin D. Kapich, Carlsbad, Calif.

[73] Assignee: GA Technologies Inc., San Diego, Calif.

[21] Appl. No.: 224,322

[22] Filed: Jan. 12, 1981

[51] Int. Cl.³ .............................................. G21C 15/00
[52] U.S. Cl. .................................. 376/367; 376/386; 376/391; 376/402; 60/644.1
[58] Field of Search ............... 376/367, 386, 391, 393, 376/394, 402, 404, 406; 60/644, DIG. 4, 671, 651

[56] References Cited

U.S. PATENT DOCUMENTS

| | | | |
|---|---|---|---|
| 1,979,128 | 10/1934 | Watson | 60/671 |
| 2,952,138 | 9/1960 | Russell | 60/671 |
| 2,970,434 | 2/1961 | Warren . | |
| 3,210,943 | 9/1965 | Acklin . | |
| 3,246,697 | 4/1966 | Natland . | |
| 3,252,286 | 5/1966 | Whitelaw . | |
| 3,258,909 | 7/1966 | Davis et al. . | |
| 3,304,232 | 2/1967 | Schutt . | |
| 3,329,575 | 7/1967 | Burbach et al. . | |
| 3,336,207 | 8/1967 | Peterson . | |
| 3,974,029 | 8/1976 | George | 376/391 |
| 4,000,617 | 1/1977 | Fortescue | 376/391 |
| 4,048,012 | 9/1977 | George | 376/391 |
| 4,177,651 | 12/1979 | McFarland | 60/671 |
| 4,293,384 | 10/1981 | Weber | 376/391 |

Primary Examiner—Donald P. Walsh
Attorney, Agent, or Firm—Fitch, Even, Tabin & Flannery

[57] ABSTRACT

A system for producing process heat which employs a high temperature gas cooled nuclear reactor and is adapted to provide process heat at temperatures higher than the reactor core temperature. The system includes a closed secondary loop having a working fluid heated to a first temperature by the coolant of the reactor core in an intermediate heat exchanger, and has a heat pump connected in the secondary loop which increases the temperature of the working fluid to a temperature above the core coolant temperature. Steam in an independent closed nuclear steam supply circuit is heated directly by the core coolant in a steam generator and provides steam for make-up driving power to the heat pump in the secondary loop. The steam supply circuit also supplies additional steam to generate electric power and process steam. The size of the intermediate heat exchanger is minimized to enable maximum utilization of the steam supply circuit.

7 Claims, 1 Drawing Figure

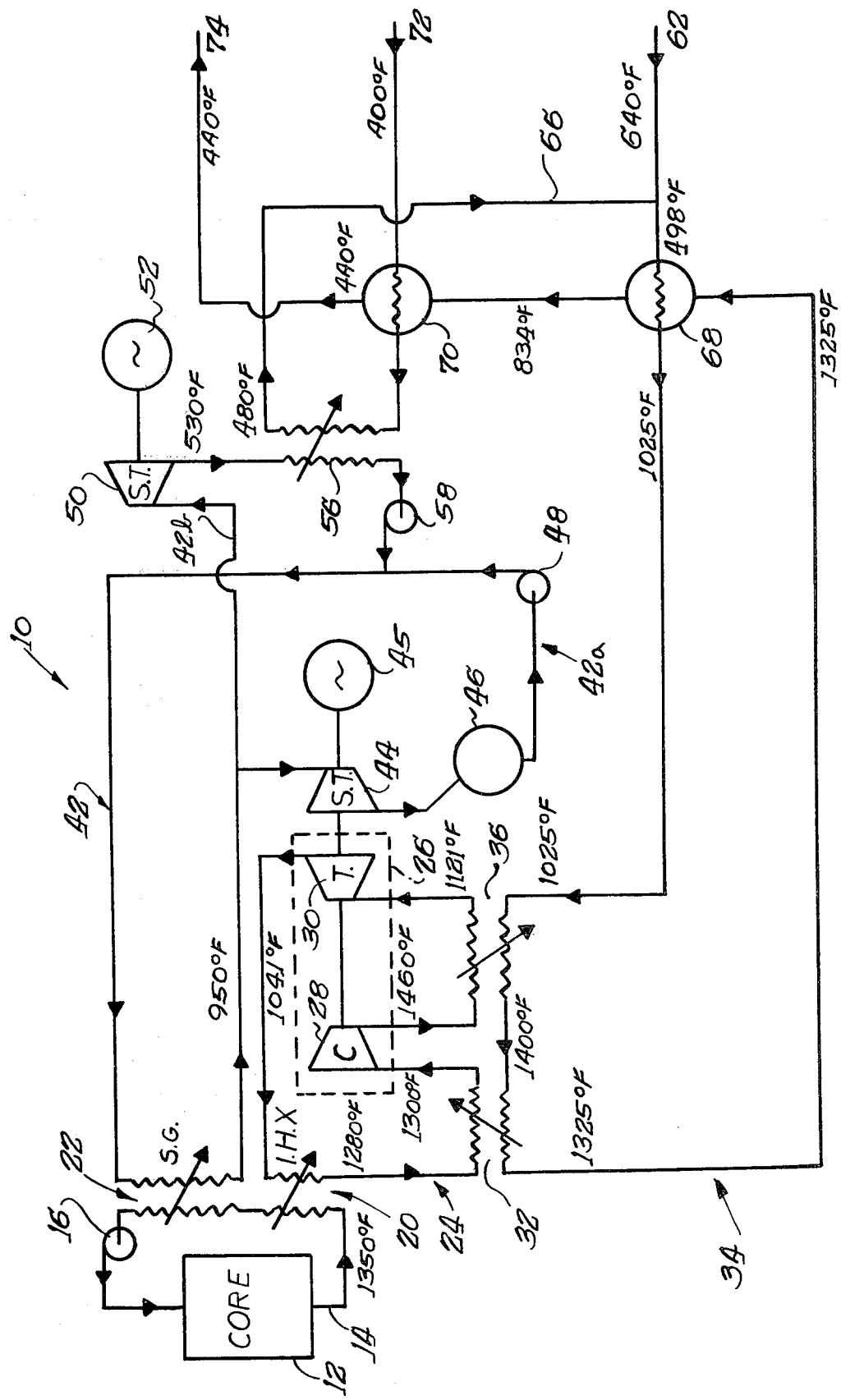

SYSTEM FOR PRODUCING PROCESS HEAT

The present invention relates generally to nuclear reactor systems for producing process heat, and more particularly to such a system which employs a high temperature gas cooled nuclear reactor and is capable of providing process heat temperatures higher than the reactor core temperature. The system includes an intermediate heat exchanger and a steam generator which are independently located within the reactor vessel to absorb heat from the core coolant, and are connected, respectively, in a closed secondary loop carrying a working fluid which is heated to provide the process heat, and an independent steam supply circuit.

It is generally known to utilize the heat from a nuclear reactor to provide the energy necessary to carry out certain chemical reactions. However, in order for a nuclear reactor to be an economical source of heat for many chemical processes, the reactor must operate at temperatures higher than can be obtained with light water reactors or with gas cooled reactors based on present day technology. It is known to augment the temperature of a light water reactor in systems for converting heat to mechanical work in the form of electricity. See, for example, U.S. Pat. No. 3,329,575. However, the temperature of the working fluid, usually steam, obtained with a light water reactor is substantially lower, e.g., approximately 600° F., than is necessary to carry out many chemical processes requiring temperatures in the order of 1200°–1800° F.

It is believed that the use of nuclear energy in many processes, for example, the production of hydrogen by reforming a light hydrocarbon such as methane, or the production of hydrogen by thermal chemical water splitting, may result in the production of a more economical product or may have other advantages such as high product yield per unit of hydrocarbon feed or lower environmental consequences. While light water reactors cannot be operated at a temperature range enabling their practical use as a source of heat for chemical processes requiring relatively high temperatures, that is, temperatures in the range of about 1200°–1800° F., it is possible to obtain the required temperatures by utilizing a heat pump in combination with a high temperature gas cooled reactor constructed in accordance with present day technology.

One of the primary objects of the present invention is to provide a novel system for producing process heat which employs a high temperature gas cooled reactor and which is capable of producing process heat at temperatures higher than the reactor core temperature with maximum cycle efficiency and minimum cost.

A more particular object of the present invention lies in the provision of a system for producing process heat which employs a high temperature gas cooled reactor and which has an intermediate heat exchanger and a steam generator located in the reactor vessel independently of each other and connected, respectively, in a closed secondary circuit and an independent steam supply circuit. A working fluid in the secondary circuit is heated initially by the core coolant and has its temperature increased by a heat pump whose driving power is obtained in part from the steam supply circuit. The steam supply circuit is also capable of generating steam for electric power and process steam.

A feature of the present invention lies in locating both the intermediate heat exchanger and steam generator within the reactor vessel so that the steam generator absorbs heat directly from the core coolant and may be sized to optimize heat transfer to the steam generator while minimizing the size, and thus the cost, of the intermediate heat exchanger.

Another feature of the present invention lies in providing the steam supply circuit with a pair of independent loops, one of which supplies make-up driving power to the heat pump in the secondary process heat circuit, and the other of which may be independently expanded for generating process steam and/or generating electricity.

Further objects, advantages and features of the present invention, together with its organization and manner of operation, will become apparent from the following detailed description of the invention when taken in conjunction with the accompanying drawing which schematically illustrates the circuit of a system for producing process heat utilizing a high temperature gas cooled reactor in accordance with the present invention.

With reference to the drawing, a system in accordance with the present invention for producing process heat and which employs a high temperature gas cooled reactor is schematically illustrated and indicated in its entirety by reference numeral 10. The system 10 includes a high temperature gas cooled reactor the core of which is indicated at 12. The core 12 is formed in a reactor vessel (not shown), such as a prestressed concrete reactor vessel, and houses fuel elements or fuel blocks of conventional design. The core has a closed cooling circuit or loop 14 associated therewith which includes a conventional circulator 16 adapted to pass a suitable coolant, such as helium, through the reactor core. In the illustrated embodiment, the core 12 heats the coolant passing therethrough to a temperature of approximately 1350° F. As will be described, the system 10 is capable of providing process heat at temperatures higher than the temperature to which the core coolant is heated as it passes through the core.

The core cooling circuit 14 has cooperative relation with an intermediate heat exchanger 20 and a steam generator heat exchanger 22 so that the core coolant flows directly through heat exchangers 20 and 22. Both the intermediate heat exchanger 20 and the steam generator 22 are located within the reactor vessel in which the reactor core 12 is formed and each is adapted to absorb heat directly from the core coolant. The intermediate heat exchanger 20 is connected in a closed secondary loop or circuit, indicated generally at 24, which includes a heat pump, shown internally of dash line 26. The heat pump, which may alternatively be termed a turbo-expander, includes a compressor 28 driven by a turbine 30 in a conventional manner.

The secondary loop 24 contains a working fluid such as nitrogen, helium, steam, carbon dioxide, or other suitable gas or mixture of gases, which, in the illustrated embodiment, is heated as it passes through the intermediate heat exchanger 20 to a temperature of approximately 1280° F. Prior to entering the compressor 28, the working fluid in the secondary loop passes through a heat exchanger 32 which has cooperative relation with a process loop or circuit, indicated generally at 34, so that the working fluid is heated to approximately 1300° F. The working fluid passes from the heat exchanger 32 through the compressor 28 during which it is heated by compression to approximately 1460° F. after which the heated working fluid passes through a reaction chamber 36 in the form of a heat exchanger reformer where heat is transferred from the working fluid of the secondary loop to a process fluid within the process loop or circuit 34.

The heated working fluid in the secondary loop 24 is discharged from the reformer 36 at approximately 1121° F. and passes through the turbine 30 during which the working fluid expands as it drives the turbine to supply energy to drive the compressor 28. The working fluid is discharged from turbine 30 at a temperature of approximately 1041° F. and passes to the intermediate heat exchanger 20 where it is again heated to approximately 1280° F. and recycles through the heat pump 26 to supply process heat to the reformer 36.

In accordance with one feature of the process heat producing system 10, the steam generator 22 is connected in a closed steam circuit or loop, indicated generally as 42, independent from the secondary loop 24. The steam circuit 42, which may be termed the steam supply circuit, provides steam for any needed make-up driving power to the turbine 30 of the turboexpander 26 through a first loop, and supplies additional steam to generate electrical power and process steam in a second loop. As aforementioned, the heat exchanger 20 and steam generator 22 are preferably mounted within a common cavity or chamber in the reactor vessel so that heat is transferred directly from the core coolant to the secondary loop 24 and the steam loop or circuit 42. In the illustrated embodiment, the capacity of the intermediate heat exchanger 20 is selected so as to be received approximately 28% of the total core heat capacity so that approximately 72% of the core coolant heat is transferred to the steam generator 22 and thus to the closed steam circuit 42. In this manner, the size of the intermediate heat exchanger 20, which generally is a relatively expensive component of the overall system, is minimized with attendant capital cost economies being realized. In the illustrated embodiment, steam at a temperature of approximately 950° F. and 2400 psia is discharged from the steam generator 22.

The steam circuit 42 includes a first loop 42a which includes a steam turbine 44 connected to receive approximately one-half of the steam discharged from the steam generator 22. The steam turbine 44 is connected to the turbine 30 of the heat pump or turbocompressor 26 so as to provide any make-up energy required to drive the compressor 28. The steam turbine 44 may also be employed to drive an electric generator 45. From the steam turbine 44, steam within loop 42a passes through a condensor 46 and through a circulating pump 48 which returns the condensed steam to the inlet side of the steam generator 22.

The steam circuit 42 includes a second loop 42b which also includes a steam turbine 50 adapted to drive an electrical generator 52. Steam at 530° F. leaving the steam turbine 50 is passed through a heat exchanger 56 during which the steam condenses as the heat is transferred to process water being fed to the process loop 34, which in turn evaporates as will be described. The condensed steam from the heat exchanger 56 is returned to the steam generator 22 by a pump 58.

The process circuit 34 includes a source of feed gas 62 which is to undergo a chemical reaction in the reformer 36. For example, the feed gas may comprise a light hydrocarbon such as methane used in the production of hydrogen by reforming the light hydrocarbon. The feed gas is preferably supplied at approximately 640° F. and 500 psia and is combined with heated process steam from a conduit 66 after which the mixture of feed gas and process steam are passed through a heat exchanger 68 which receives the heated products of combustion from the reformer 36 at approximately 1325° F. and heats the feed gas and process water mixture to approximately 1025° F. The mixture of feed gas and process steam passes through the reformer 36 where it is heated to approximately 1400° F. by the working gas in the secondary loop 24.

The products of the chemical reaction which takes place in the reformer 36 are passed through the heat exchanger 32 where heat is transferred to the working fluid in the secondary loop 24 prior to the working fluid entering the compressor 28. From the heat exchanger 32, the products of combustion pass through the heat exchanger 68 and through another heat exchanger 70 where heat is transferred to the feed gas/steam mixture and the process water from source 72, respectively. The process water is preferably provided from the source 72 at approximately 400° F. and passes through the heat exchangers 70 and 56 from which its exits at approximately 480° F., passing then to conduit 66 to combine with the feed gas supplied at 62. The effluent from the reformer 36 may be suitable discharged from the system at 74.

The system 10 in acccordance with the present invention offers a number of advantages. One of its primary advantages is that the system enables a relatively small size intermediate heat exchanger 20 to be employed while maximizing the efficiency of the steam generator 22. This is accomplished by mounting the intermediate heat exchanger 20 and steam generator 22 within the reactor vessel so that each is directly heated by the core coolant independently of the other. Since the intermediate heat exchanger 20 is a relatively expensive component of the system, heating the steam generator 22 directly from the core coolant minimizes the size of the intermediate heat exchanger required, as opposed to employing a large intermediate heat exchanger and utilizing the working fluid in the secondary loop to supply heat to the steam generator. By thus reducing the size of the intermediate heat exchanger, substantial capital cost reductions and increased efficiencies may be realized.

Additionally, it is estimated that by employing the steam generator 22 independent of the intermediate heat exchanger 20 the size of the intermediate heat exchanger may be reduced by a factor of approximately 2.5 and the operating burdens on the intermediate heat exchanger 20 may be lowered by a factor of approximately 3.3. Further, separating the intermediate heat exchanger 20 from the steam generator 22, the overall system can be designed with greater flexibility as to operating in an electricity generating mode or in a process heat mode for effecting chemical reactions.

While a preferred embodiment of the invention has been illustrated and described, it will be understood that changes and modifications may be made therein without departing from the invention in its broader aspects.

Various features of the invention are defined in the following claims.

I claim:

1. A system for producing process heat comprising, in combination,
  a high temperature gas cooled nuclear reactor having a fuel core and a primary cooling loop through which a coolant is circulated and undergoes an increase in temperature, a closed secondary loop having a working fluid therein, said cooling and secondary loops having cooperative association with an intermediate heat exchanger adapted to receive said working fluid therethrough and effect transfer of heat from said coolant to said working fluid as said working fluid passes through said intermediate heat exchanger, a heat pump connected in said secondary loop and including a turbine and a compressor through which said working fluid passes so that said working fluid undergoes an increase in temperature and pressure as it passes through said compressor, a process loop including a process heat exchanger adapted to receive a process fluid therethrough, said process heat exchanger being connected in circuit with said secondary loop so as to receive said working fluid from said compressor and transfer heat from said working fluid to said process fluid as it passes through said process heat exchanger, said secondary loop being operative to pass said working fluid from said process heat exchanger back to said intermediate heat exchanger through said turbine so as to effect driving relation of said turbine, and a closed steam circuit including a steam generator operatively associated with said cooling loop so as to receive said coolant therethrough and transfer heat from said coolant to condensed steam passing through said steam generator to produce steam, said steam circuit including a steam turbine operatively associated with the turbine of said heat pump so as to assist in driving said compressor, said process loop including a source of feed gas and a source of process fluid and adapted to mix said feed gas and process fluid and pass the mixture to said process heat exchanger for heating by said working fluid therein.

2. The system as defined in claim 1 wherein said secondary loop and said process loop have an additional mutually cooperable heat exchanger adapted to receive the process fluid from said process heat exchanger and transfer heat to said working fluid prior to said working fluid passing through said process heat exchanger.

3. The system as defined in claim 1 wherein said steam turbine is connected in a first loop of said steam circuit, said steam circuit including a second loop having a steam turbine therein operative to drive an electric generator or the like.

4. The system as defined in claim 1 including an additional heat exchanger connected in said process loop and adapted to receive the products from said process heat exchanger and heat the process fluid prior to its mixture with said feed gas.

5. The system as defined in claim 4 including an additional heat exchanger in said process loop adapted to receive the products from said process heat exchanger and preheat said mixture of feed gas and process fluid prior to passage of said mixture through said process heat exchanger.

6. The system as defined in claim 1 wherein said intermediate heat exchanger and said steam generator are located in generally close proximity within a common chamber within a reactor containment vessel.

7. The system as defined in claim 1 wherein said process heat exchanger comprises a reformer.

* * * * *